(12) United States Patent
Hannula et al.

(10) Patent No.: US 9,032,752 B2
(45) Date of Patent: May 19, 2015

(54) CONDENSER COOLING SYSTEM AND METHOD INCLUDING SOLAR ABSORPTION CHILLER

(75) Inventors: Scott Victor Hannula, Westminster, MA (US); Duncan George Watt, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 536 days.

(21) Appl. No.: 13/354,107

(22) Filed: Jan. 19, 2012

(65) Prior Publication Data
US 2013/0187391 A1 Jul. 25, 2013

(51) Int. Cl.
| | | |
|---|---|---|
| F25B 7/00 | (2006.01) | |
| F25B 27/00 | (2006.01) | |
| F25B 15/00 | (2006.01) | |
| F02C 1/00 | (2006.01) | |
| F02C 6/00 | (2006.01) | |
| F01D 25/08 | (2006.01) | |
| F01K 9/00 | (2006.01) | |
| F01K 23/10 | (2006.01) | |

(52) U.S. Cl.
CPC .............. *F01K 9/003* (2013.01); *F01K 23/10* (2013.01); *Y02E 20/16* (2013.01)

(58) Field of Classification Search
CPC ............ F25B 27/00; F25B 15/00; F02C 6/00; F02C 6/18; F02C 7/10
USPC ................ 62/238.4, 79, 238.3, 476, 235.1; 60/772, 39.182; 415/177
See application file for complete search history.

(56) References Cited

U.S. PATENT DOCUMENTS

| | | | |
|---|---|---|---|
| 4,004,424 A | | 1/1977 | Maddagiri |
| 4,143,705 A | * | 3/1979 | Awalt, Jr. ...................... 165/48.2 |
| 6,000,211 A | | 12/1999 | Bellac et al. |
| 6,050,083 A | * | 4/2000 | Meckler ..................... 60/39.182 |
| 6,484,506 B1 | | 11/2002 | Bellac et al. |
| 6,941,759 B2 | * | 9/2005 | Bellac et al. ..................... 60/772 |
| 7,328,587 B2 | * | 2/2008 | Shaffer et al. ................ 62/228.1 |
| 2002/0053214 A1 | * | 5/2002 | Melendez-Gonzalez et al. ............................. 62/235.1 |
| 2003/0041608 A1 | * | 3/2003 | Gonzalez-Cruz et al. ... 62/235.1 |
| 2009/0241546 A1 | | 10/2009 | Hegazy |
| 2011/0154842 A1 | * | 6/2011 | Heydari et al. .............. 62/259.2 |
| 2011/0289935 A1 | | 12/2011 | Danov |
| 2012/0067047 A1 | * | 3/2012 | Peterson et al. ................ 60/651 |

FOREIGN PATENT DOCUMENTS

| | | |
|---|---|---|
| DE | 102009007232 A1 | 8/2010 |
| WO | 2009064378 A2 | 5/2009 |
| WO | 2011011831 A1 | 2/2011 |

OTHER PUBLICATIONS

Search report and written opinion from EP Application No. 13151451.5 dated Apr. 2, 2013.

\* cited by examiner

*Primary Examiner* — Mohammad M Ali
*Assistant Examiner* — Erik Mendoza-Wilkenfel
(74) *Attorney, Agent, or Firm* — Ernest G. Cusick; Hoffman Warnick LLC

(57) ABSTRACT

A system configured to thermally regulate exhaust portions of a power plant system (e.g. steam turbine) is disclosed. In one embodiment, a system includes: a condenser adapted to connect to and thermally regulate exhaust portions of a steam turbine; and a cooling system operably connected to the condenser and adapted to supply a cooling fluid to the condenser, the cooling system including a solar absorption chiller adapted to adjust a temperature of the cooling fluid.

12 Claims, 6 Drawing Sheets

CONDENSER COOLING SYSTEM AND METHOD INCLUDING SOLAR ABSORPTION CHILLER

BACKGROUND OF THE INVENTION

The subject matter disclosed herein relates to power plant systems and, more particularly, to steam turbine operation in power plant systems.

Some power plant systems, for example certain nuclear, fossil fuel, solar, simple-cycle and combined-cycle power plant systems, employ turbines (e.g., steam turbines, gas turbines, etc.) in their design and operation. Some turbines in these systems are connected to a condenser which during operation may cool portions of and/or fluids within the turbine via a cooling fluid. This cooling by the condenser may lower exhaust pressure in the turbine, thereby improving the output and heat rate of the turbine and the overall power generation system. Some condensers circulate the cooling fluid about the turbine to transfer heat from the turbine to the cooling fluid. In these condensers, as a temperature of the cooling fluid is decreased relative to a temperature of the fluids and components of the turbine, the cooling process and overall system efficiency is improved. Some systems include cooling towers which are connected to the condensers to supply and refrigerate the cooling fluid, reducing a temperature of the cooling fluid so as to improve the cooling process. However, the use of these cooling towers may result in inconsistent cooling fluid temperatures and cooling fluid availability which leads to variable exhaust pressure in the steam turbine, and thus inefficient operation.

BRIEF DESCRIPTION OF THE INVENTION

Systems for thermally regulating a condenser cooling fluid for a turbine are disclosed. In one embodiment, a system includes: a condenser adapted to connect to and thermally regulate exhaust portions of a turbine; and a cooling system operably connected to the condenser and adapted to supply a cooling fluid to the condenser, the cooling system including a solar absorption chiller adapted to adjust a temperature of the cooling fluid.

A first aspect of the invention provides a system including: a condenser adapted to connect to and thermally regulate exhaust portions of a steam turbine; and a cooling system operably connected to the condenser and adapted to supply a cooling fluid to the condenser, the cooling system including a solar absorption chiller adapted to adjust a temperature of the cooling fluid.

A second aspect of the invention provides a method including: thermally regulating a cooling fluid in a cooling tower; directing a flow of the cooling fluid from the cooling tower to a solar absorption chiller; thermally regulating the flow of the cooling fluid in the solar absorption chiller; directing the flow of the cooling fluid from the solar absorption chiller to a condenser to thermally regulate exhaust portions of a steam turbine; and directing the flow of the cooling fluid from the condenser to the cooling tower.

A third aspect of the invention provides a combined cycle power generation system including: a gas turbine; a heat recovery steam generator (HRSG) operably connected to the gas turbine; a steam turbine operably connected to the HRSG; at least one generator operably connected to at least one of the gas turbine or the steam turbine; a condenser operably connected to the steam turbine; and a cooling system operably connected to the condenser and adapted to supply a cooling fluid to the condenser, the cooling system including a solar absorption chiller adapted to adjust a temperature of the cooling fluid.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
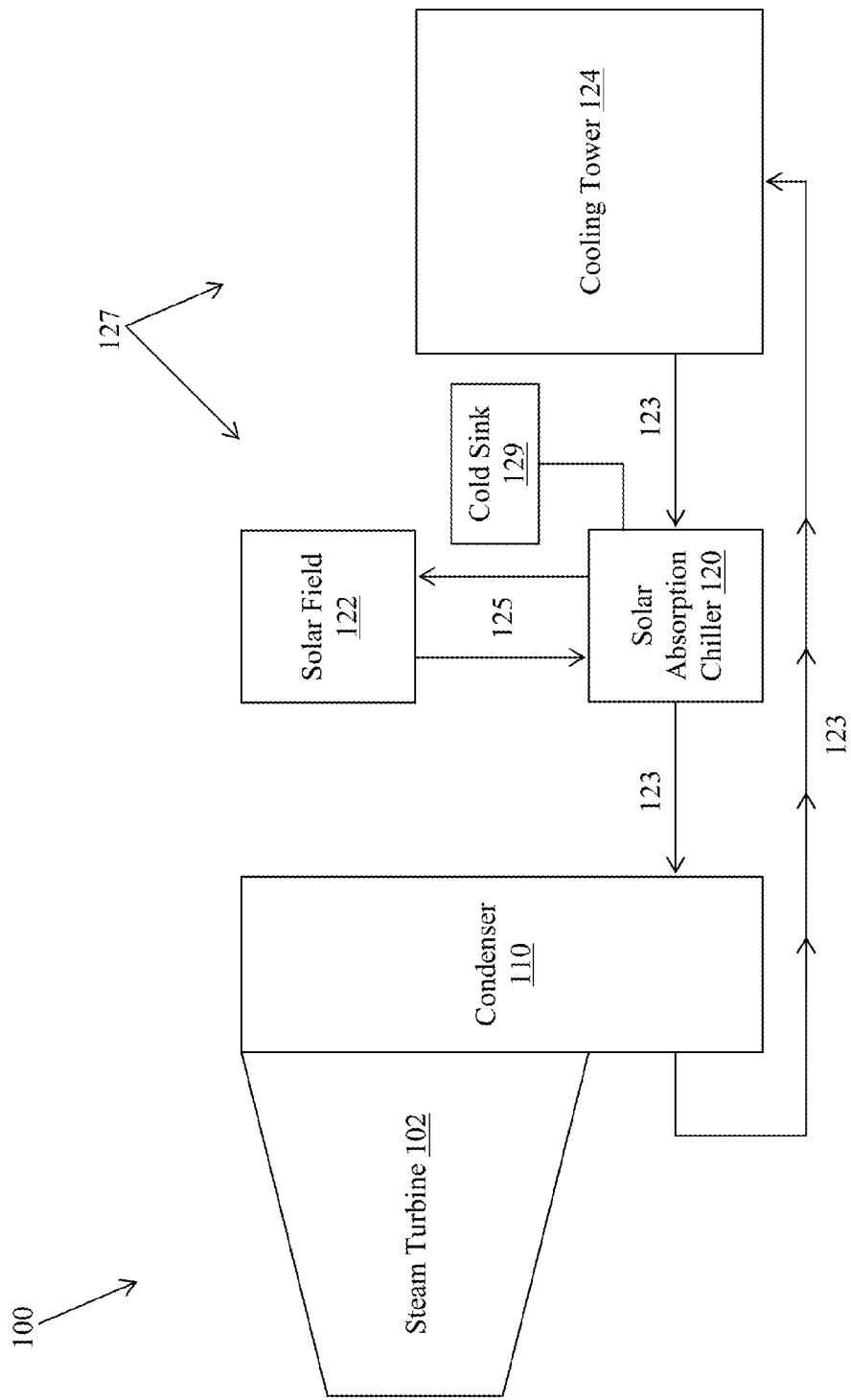
FIG. 1 shows a schematic illustration of an environment including a cooling system in accordance with an embodiment of the invention.
Figure 2:
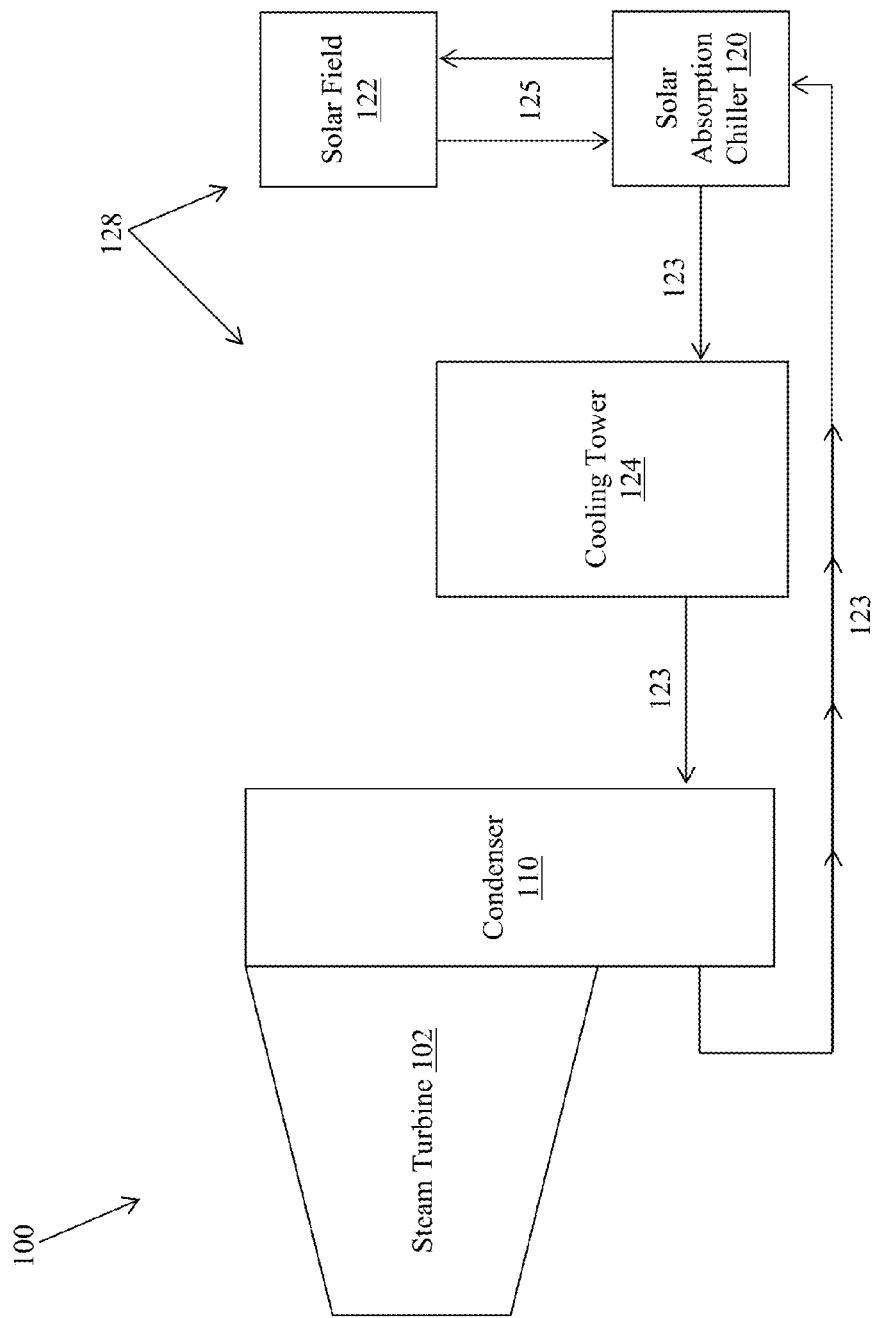
FIG. 2 shows a schematic illustration of an environment including a cooling system in accordance with an embodiment of the invention.

It is noted that the drawings of the disclosure may not necessarily be to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, aspects of the invention provide for systems configured to thermally regulate a supply of a cooling fluid to a condenser in order to decrease turbine exhaust pressure and improve turbine performance in terms of output and heat rate. These systems include a solar absorption chiller which is adapted to refrigerate and/or adjust a temperature of the cooling fluid being supplied to the condenser for cooling of the turbine.

Some power generation systems (including, e.g., steam turbines, gas turbines, solar power plants, concentrated solar power plants, etc.) may include a condenser for thermally regulating (e.g., cooling) working fluids, exhaust fluids or components and portions of a turbine. The thermal regulation provided by the condenser helps to lower exhaust pressure in the turbine and thereby improves the overall output and heat rate of the turbine. Typically, the condenser is connected to a set of cooling towers from which it may draw and circulate a cooling fluid about or in contact with the turbine to dissipate heat from the exhaust portions of the turbine. However, the cooling fluid supplied by these cooling towers may have a varying temperature which depends upon system conditions, availability and/or recent system demands. This lack of a consistent supply of thermally optimized cooling fluid may lead to variations in exhaust pressure of the turbine, and thus, inefficient operation of the turbine and the power generation system.

Turning to the FIGURES, embodiments of a system configured to thermally regulate exhaust portions of a turbine (e.g., a steam turbine) by including a solar absorption chiller in the system are shown. Each of the components in the FIGURES may be connected via hardwired, wireless, conduit, or other conventional means as is indicated in FIGS. 1-6. Specifically, referring to FIG. 1, a schematic top view of an environment 100 including a steam turbine 102 connected to a condenser 110 is shown in accordance with an embodiment of the invention. Condenser 110 is connected to a cooling system 127 which supplies a flow of a cooling fluid 123 to condenser 110 for thermal regulation of steam turbine 102. Cooling system 127 includes a cooling tower 124 and a solar absorption chiller 120 which thermally regulate (e.g., refrigerate) cooling fluid 123. Cooling tower 124 and/or solar absorption chiller 120 may dissipate heat from cooling fluid 123 via direct and/or indirect cooling. It is understood that cooling tower 124 may include any now known or later developed cooling tower, and that solar absorption chiller 120 may include any now known or later developed solar absorption chiller.

In an embodiment of the present invention, a temperature of cooling fluid 123 may be adjusted or maintained by cooling tower 124. In one embodiment, cooling tower 124 refrigerates cooling fluid 123, setting a temperature of cooling fluid 123. In one embodiment, the temperature of cooling fluid 123 may be low relative to an exhaust temperature and/or exhaust component temperature of steam turbine 102. In one embodiment, cooling fluid 123 may flow from cooling tower 124 to solar absorption chiller 120 which may further cool and/or adjust a flow of cooling fluid 123. In one embodiment, solar absorption chiller 120 may be connected to a solar field 122 and adapted to receive, adjust and/or circulate a solar field working fluid 125 from solar field 122. It is understood that solar field 122 may include a solar power field, a set of parabolic troughs, a central heater, solar panels, solar collector, or any other solar power generation system now known or later developed.

In one embodiment, energy obtained from solar field working fluid 125 may be used by solar absorption chiller 120 to thermally adjust (e.g., refrigerate) cooling fluid 123. In another embodiment, solar field working fluid 125 may be mixed with cooling fluid 123 to decrease a temperature of cooling fluid 123. In another embodiment, solar field working fluid 125 may decrease a temperature of cooling fluid 123 without mixing (e.g. use of a heat exchanger, use of a cold sink, etc.). In one embodiment, solar absorption chiller 120 may generate ice using energy obtained from solar field working fluid 125, the ice being used to thermally store energy obtained from solar field working fluid 125 for later use by solar absorption chiller 120 in refrigerating cooling fluid 123. In another embodiment, solar absorption chiller 120 may direct energy from solar field working fluid 125 to a cold sink 129 to store the obtained energy for later use in refrigerating cooling fluid 123. In one embodiment, cooling fluid 123 and/or solar field working fluid 125 may comprise water. In another embodiment, cooling fluid 123 and/or solar field working fluid 125 may include Lithium Bromide (LiBr). In another embodiment, shown in FIG. 2, cooling fluid 123 may flow from condenser 110 to a cooling system 128. In cooling system 128, cooling fluid 123 is preliminary cooled by solar absorption chiller 120 and is then passed to cooling tower 124 for further cooling and storage before recirculation to condenser 110.

Figure 3:
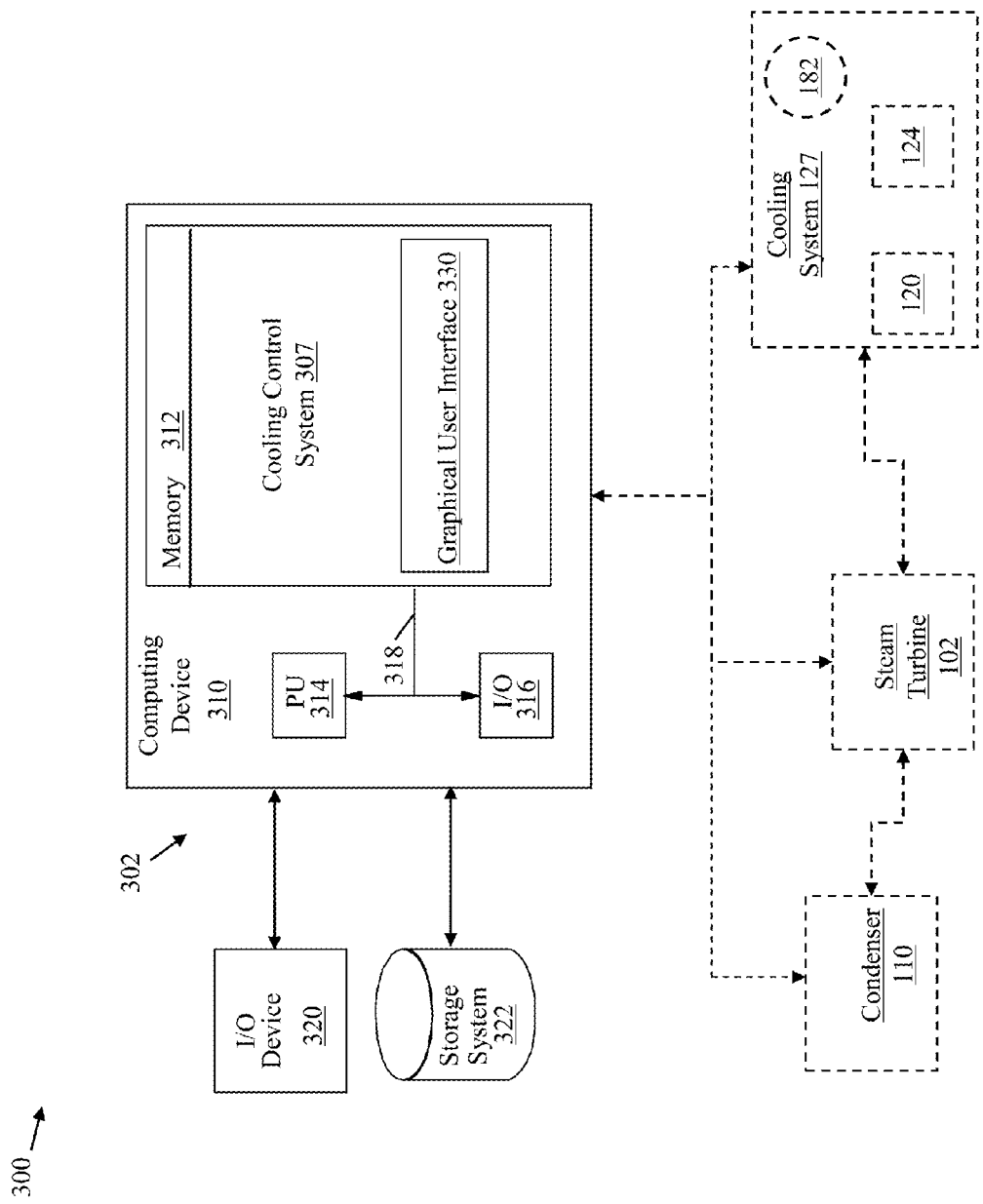
FIG. 3 shows a schematic illustration of an environment including a cooling control system in accordance with an embodiment of the invention.

Turing to FIG. 3, an illustrative environment 300 including a cooling control system 307 is shown according to embodiments of the invention. Environment 300 includes a computer infrastructure 302 that can perform the various processes described herein. In particular, computer infrastructure 302 is shown including computing device 310 which includes cooling control system 307, which enables computing device 310 to manage thermal regulation/cooling of portions of a power generation system (e.g., steam turbine 102, a solar power plant, a concentrated solar power plant, etc.) by performing the process steps of the disclosure.

As will be appreciated by one skilled in the art, the cooling system described herein may be embodied as a system(s), method(s), operator display (s) or computer program product (s), e.g., as part of a power plant system, a power generation system, a turbine system, etc. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-useable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As previously mentioned and discussed further below, cooling control system 307 has the technical effect of enabling computing device 310 to perform, among other things, the exhaust temperature control operations described herein. It is understood that some of the various components shown in FIG. 3 can be implemented independently, combined, and/or stored in memory for one or more separate computing devices that are included in computing device 310. Further, it is understood that some of the components and/or functionality may not be implemented, or additional schemas and/or functionality may be included as part of cooling control system 307.

Computing device 310 is shown including a memory 312, a processor unit (PU) 314, an input/output (I/O) interface 316, and a bus 318. Further, computing device 310 is shown in communication with an external I/O device/resource 320 and a storage system 322. As is known in the art, in general, PU 314 executes computer program code, such as cooling control system 307, that is stored in memory 312 and/or storage system 322. While executing computer program code, PU 314 can read and/or write data, such as graphical user interface 330 and/or operational data 334, to/from memory 312, storage system 322, and/or I/O interface 316. Bus 318 provides a communications link between each of the components in computing device 310. I/O device 320 can comprise any device that enables a user to interact with computing device 310 or any device that enables computing device 310 to communicate with one or more other computing devices. Input/output devices (including but not limited to keyboards, displays, pointing devices, etc.) can be coupled to the system either directly or through intervening I/O controllers.

In some embodiments, as shown in FIG. 3, environment 300 may optionally include a steam turbine 102 connected to a condenser 110, and a cooling system 127 which supplies a cooling fluid 123 to condenser 110 and/or steam turbine 102 to thermally regulate components and fluids therein. In one embodiment, computing device 310 controls a flow of the cooling fluid in cooling system 127. In one embodiment, cooling system 127 may include a sensor 182 adapted to monitor a flow/obtain flow readings (e.g., temperature of cooling fluid 123, flow rate of cooling fluid 123, etc.) of cooling fluid 123 through cooling system 127. In one embodiment, computing device 310 may adjust flow of cooling fluid 123 through cooling system 127 based on operational demands and/or conditions of steam turbine 102. In another embodiment, computing device 310 may adjust flow of cooling fluid 123 through cooling system 127 based on flow readings obtained from sensor 182. In another embodiment, computing device 310 controls a temperature of the cooling fluid 123 in cooling system 127. In one embodiment, computing device 310 may control the contributions to the flow and/or temperature of the cooling fluid by a cooling tower 124 in cooling system 127. In another embodiment, computing device 310 may control the contributions to the flow and/or temperature of the cooling fluid by a solar absorption chiller 120 in cooling system 127. In one embodiment, computing device 310 may control the generation of ice and/or storing of energy in a cold sink by solar absorption chiller 120. In one embodiment, computing device 310 causes solar absorption chiller 120 to generate ice and/or store energy in a cold sink during periods of low demand (e.g., early morning, nighttime) on cooling system 127, such that this stored energy will later be available during periods of high demand (e.g., late morning, afternoon) on cooling system 127.

In any event, computing device 310 can comprise any general purpose computing article of manufacture capable of executing computer program code installed by a user (e.g., a personal computer, server, handheld device, etc.). However, it is understood that computing device 310 is only representative of various possible equivalent computing devices that may perform the various process steps of the disclosure. To this extent, in other embodiments, computing device 310 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 310 may be/include a distributed control system. In another embodiment, computing device 310 may be integral to steam turbine 102. In another embodiment, computing device 310 may be a part of a power generation system.

Figure 4:
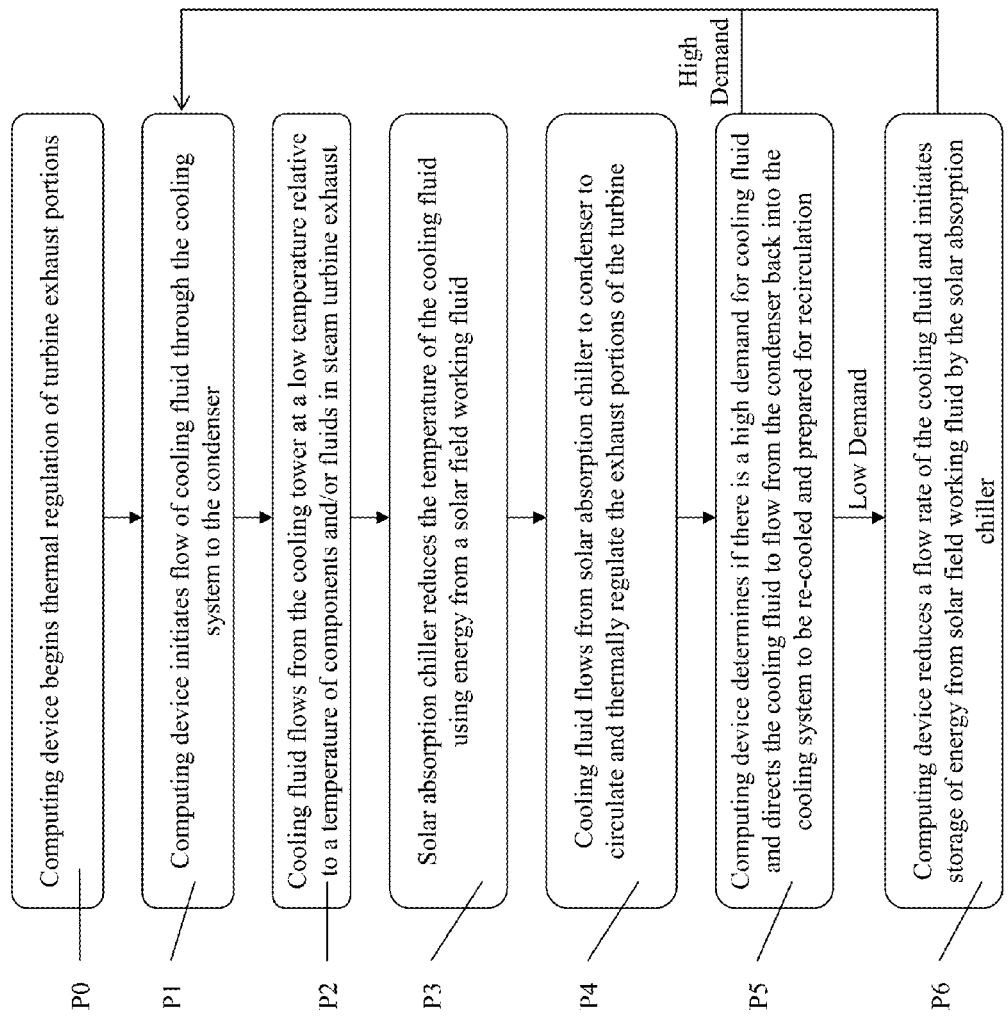
FIG. 4 shows a method flow diagram illustrating a process according to embodiments of the invention.

Turning to FIG. 4, an illustrative method flow diagram is shown according to embodiments of the invention: In pre-process P0, computing device 310 initiates thermal regulation of steam turbine 102 via condenser 110 and cooling system 127. That is, either an automatic/scheduled adjustment of the exhaust temperature of steam turbine 102, a condition dictated adjustment of the exhaust temperature of steam turbine 102 or a manual/user-commanded adjustment of the exhaust temperature of steam turbine 102 may be performed by computing device 310. Following pre-process P0, in process P1, computing device 310 initiates flow of cooling fluid 123 through cooling system 127 to condenser 110. Following process P1, in process P2, cooling fluid 123 flows from cooling tower 124 toward solar absorption chiller 120. Cooling tower 124 refrigerates cooling fluid 123 to a low temperature relative to a temperature of components and/or fluids in the exhaust portion of steam turbine 102. It is understood that cooling tower 124 may refrigerate cooling fluid 123 using any now known or later developed methods and/or systems.

In any event, following the process of P2, in process P3, solar absorption chiller 120 receives and thermally regulates (e.g., refrigerates) cooling fluid 123. In one embodiment, solar absorption chiller 120 may use direct cooling to further reduce a temperature of cooling fluid 123 via energy obtained from solar field working fluid 125. In another embodiment, solar absorption chiller 120 may use indirect cooling to further reduce a temperature of cooling fluid 123 via energy obtained from solar field working fluid 125. In another embodiment, solar absorption chiller 120 may use a heat exchanger to reduce a temperature of cooling fluid 123 via energy obtained from solar field working fluid 125. Following P3, in process P4, cooling fluid 123 flows from solar absorption chiller 120 to condenser 110 to circulate and thermally regulate exhaust portions of steam turbine 102. Following P4, in process P5, computing device 310 directs a flow of cooling fluid 123 from condenser 110 to cooling system 127. In one embodiment, computing device 310 uses sensor 182 to take flow readings/analyze a flow of cooling fluid 123 to determine if there is a relatively high thermal regulation demand (e.g., a need for increased cooling fluid 123 flow to steam turbine 102) or a relatively low thermal regulation demand (e.g., a need for decreased cooling fluid 123 flow to steam turbine 102) on cooling system 127. If computing device 310 determines that there is a relatively high demand on cooling system 127 then back to process P1 to re-cool cooling fluid 123 at cooling tower 124 and begin recirculation to further cool portions of steam turbine 102. Alternatively, if computing device 310 determines there is a relatively low demand on cooling system 127, then in process P6, computing device 310 reduces a flow rate of cooling fluid 123 and initiates storage of excess energy received from solar field working fluid 125 by solar absorption chiller 120.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
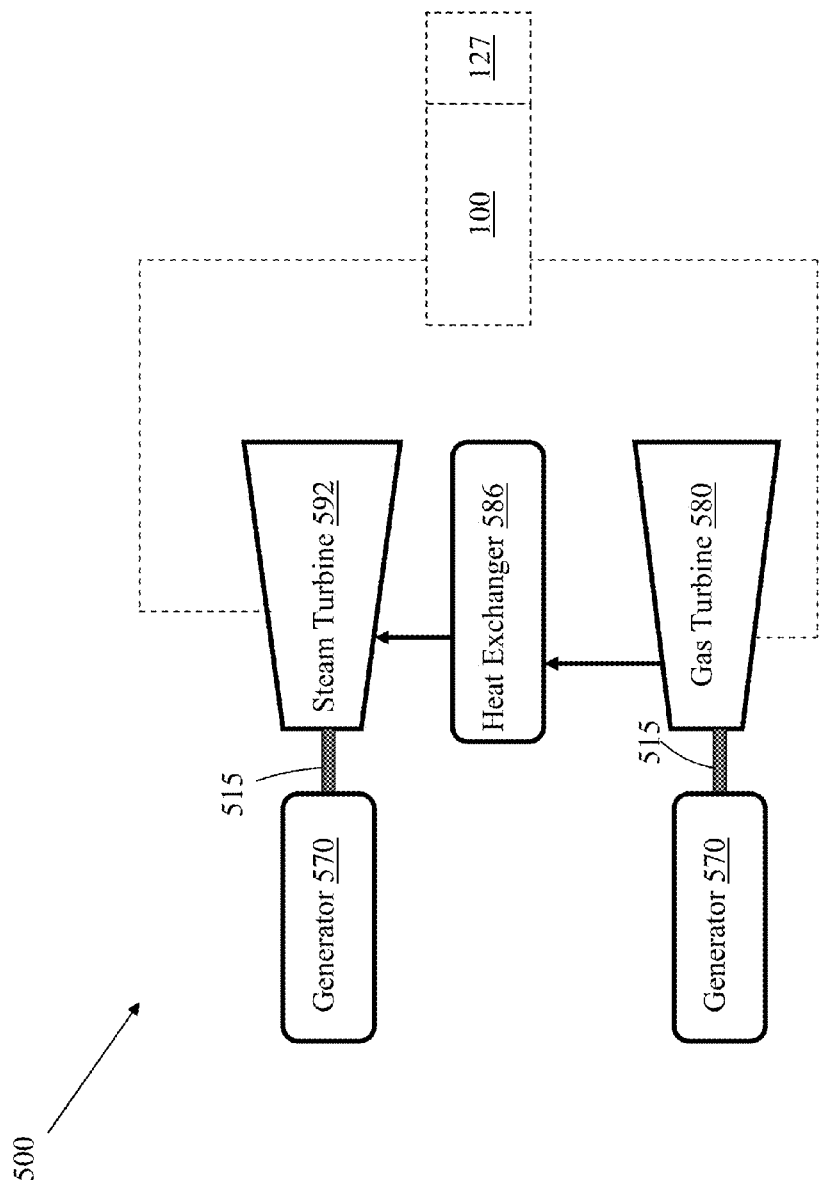
FIG. 5 shows a schematic view of portions of a multi-shaft combined cycle power plant in accordance with an aspect of the invention.
Figure 6:
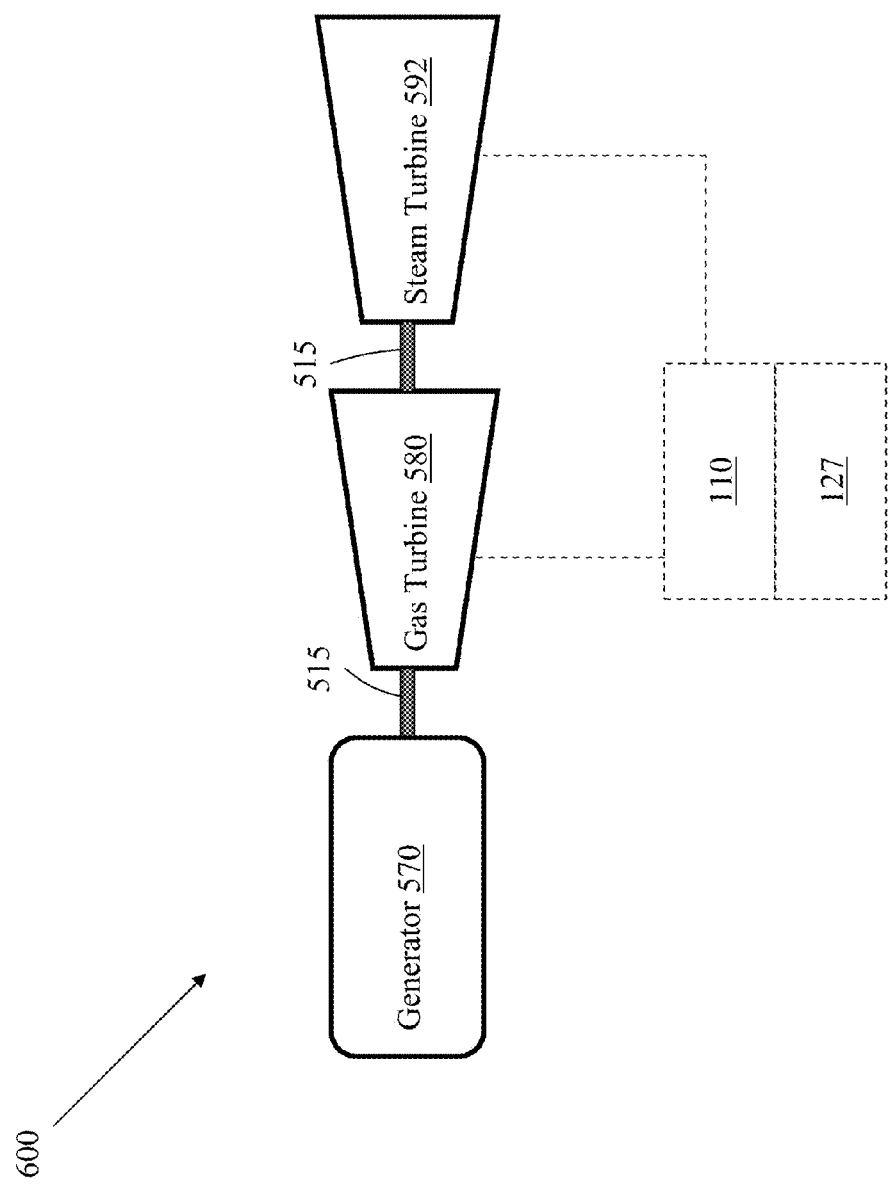
FIG. 6 shows a schematic view of portions of a single-shaft combined cycle power plant in accordance with an aspect of the invention.

Turning to FIG. 5, a schematic view of portions of a multi-shaft combined-cycle power plant 500 is shown. Combined-cycle power plant 500 may include, for example, a gas turbine 580 operably connected to a generator 570. Generator 570 and gas turbine 580 may be mechanically coupled by a shaft 515, which may transfer energy between a gas turbine 580 and generator 570. Also shown in FIG. 5 is a heat exchanger 586 operably connected to gas turbine 580 and a steam turbine 592. Heat exchanger 586 may be fluidly connected to both gas turbine 580 and steam turbine 592 via conventional conduits (numbering omitted). Heat exchanger 586 may be a conventional heat recovery steam generator (HRSG), such as those used in conventional combined-cycle power systems. As is known in the art of power generation, HRSG 586 may use hot exhaust from gas turbine 580, combined with a water supply, to create steam which is fed to steam turbine 592. Steam turbine 592 may optionally be coupled to a second generator system 570 (via a second shaft 515). Any of generator system 570, gas turbine 580, and steam turbine 592 may be operably connected to condenser 110, cooling system 127 and/or computing device 310 of FIG. 3 or other embodiments described herein. It is understood that generators 570 and shafts 515 may be of any size or type known in the art and may differ depending upon their application or the system to which they are connected. Common numbering of the generators and shafts is for clarity and does not necessarily suggest these generators or shafts are identical. Generator system 570 and second shaft 515 may operate substantially similarly to generator system 570 and shaft 515 described above. In one embodiment of the present invention (shown in phantom), cooling system 127 may be used, via computing device 310 to thermally regulate exhaust portions of either or both of steam turbine 592 and gas turbine 580. In another embodiment, shown in FIG. 6, a single-shaft combined-cycle power plant 600 may include a single generator 570 coupled to both gas turbine 580 and steam turbine 592 via a single shaft 515. Gas turbine 580 and steam turbine 592 may be operably connected to condenser 110, cooling system 127 and/or computing device 310 of FIG. 3 or other embodiments described herein.

The cooling system of the present disclosure is not limited to any one power generation system, combined cycle power generation system, turbine or other system, and may be used with other power systems. Additionally, the system of the present invention may be used with other systems not described herein that may benefit from the thermal regulation provided by the cooling system described herein.

As discussed herein, various systems and components are described as "obtaining" and/or "transferring" data (e.g., operational data, component temperatures, system specifications, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a condenser adapted to connect to and thermally regulate exhaust portions of a steam turbine; and
   a cooling system operably connected to the condenser and adapted to supply a cooling fluid to the condenser, the cooling system including:
   a solar absorption chiller adapted to adjust a temperature of the cooling fluid;
   a cooling tower upstream of the solar absorption chiller;
   a solar field connected with the solar absorption chiller and adapted to supply a solar field working fluid to the solar absorption chiller;

a cold sink connected with the solar absorption chiller and adapted to store energy obtained from the solar field working fluid; and a computing device including a cooling control system, the computing device connected with the cooling system, the steam turbine and the condenser, wherein the cooling control system is configured to:

determine whether there is a high demand or a low demand for cooling fluid at the condenser, in response to the high demand for cooling fluid, directing cooling fluid to flow from the condenser back to the cooling system to be re-cooled, and in response to the low demand for cooling fluid, reducing a flow rate of the cooling fluid and directing the solar field working fluid to the cold sink.

2. The system of claim 1, wherein the solar absorption chiller is adapted to generate ice.

3. The system of claim 1, further comprising a heat exchanger connected to the solar absorption chiller and adapted to transfer energy between a solar field working fluid and the cooling fluid.

4. A combined cycle power generation system comprising:
a gas turbine;
a heat recovery steam generator (HRSG) operably connected to the gas turbine;
a steam turbine operably connected to the HRSG;
at least one generator operably connected to at least one of the gas turbine or the steam turbine;
a condenser operably connected to the steam turbine; and
a cooling system operably connected to the condenser and adapted to supply a cooling fluid to the condenser, the cooling system including a solar absorption chiller adapted to adjust a temperature of the cooling fluid,
a cooling tower upstream of the solar absorption chiller;
a solar field connected with the solar absorption chiller and adapted to supply a solar field working fluid to the solar absorption chiller;
a cold sink connected with the solar absorption chiller and adapted to store energy obtained from the solar field working fluid; and
a computing device including a cooling control system, the computing device connected with the cooling system, the steam turbine and the condenser, wherein the cooling control system is configured to:

determine whether there is a high demand for the cooling fluid or a low demand for the cooling fluid at the condenser, in response to the high demand for the cooling fluid, directing the cooling fluid to flow from the condenser back to the cooling system to be re-cooled, and in response to the low demand for the cooling fluid, reducing a flow rate of the cooling fluid and directing the solar field working fluid to the cold sink.

5. The combined cycle power generation system of claim 4, wherein the solar absorption chiller is adapted to generate ice.

6. The combined cycle power generation system of claim 4, further comprising a heat exchanger connected to the solar absorption chiller and adapted to transfer energy between a solar field working fluid and the cooling fluid.

7. The system of claim 1, wherein a temperature of the cooling fluid is adjusted or maintained by the cooling tower.

8. The combined cycle power generation system of claim 4, wherein a temperature of the cooling fluid is adjusted or maintained by the cooling tower.

9. The system of claim 1, wherein the cooling system includes a sensor adapted to monitor the flow rate of the cooling fluid through cooling system.

10. The system of claim 9, wherein the control system determines whether there is a high demand or a low demand for the cooling fluid based upon the flow rate of the cooling fluid through the cooling system.

11. The combined cycle power generation system of claim 4, wherein the cooling system includes a sensor adapted to monitor the flow rate of the cooling fluid through cooling system.

12. The combined cycle power generation system of claim 11, wherein the control system determines whether there is a high demand or a low demand for the cooling fluid based upon the flow rate of the cooling fluid through the cooling system.

* * * * *